United States Patent
Watanabe (10) Patent No.: US 12,315,170 B2
(45) Date of Patent: May 27, 2025

(54) MOTION DETECTION SYSTEM AND METHOD

(71) Applicant: OmniVision Technologies, Inc., Santa Clara, CA (US)

(72) Inventor: Hitoshi Watanabe, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 615 days.

(21) Appl. No.: 17/700,655

(22) Filed: Mar. 22, 2022

(65) Prior Publication Data

US 2022/0301187 A1      Sep. 22, 2022

Related U.S. Application Data

(60) Provisional application No. 63/164,111, filed on Mar. 22, 2021.

(51) Int. Cl.
  *G06T 7/246*    (2017.01)
  *G06T 7/00*     (2017.01)

(52) U.S. Cl.
  CPC ............... *G06T 7/246* (2017.01); *G06T 7/97* (2017.01)

(58) Field of Classification Search
  CPC ............ G06T 7/20; G06T 7/269; G06V 20/00
  See application file for complete search history.

(56) References Cited

U.S. PATENT DOCUMENTS

| | | | |
|---|---|---|---|
| 2007/0031004 A1* | 2/2007 | Matsui | G06T 7/35 382/103 |
| 2008/0030586 A1* | 2/2008 | Helbing | H04N 25/41 348/208.4 |
| 2008/0107307 A1* | 5/2008 | Altherr | G06T 7/246 348/208.99 |

(Continued)

FOREIGN PATENT DOCUMENTS

| CN | 104537688 A | * | 4/2015 | ............ G06T 7/215 |
|---|---|---|---|---|
| CN | 106910203 A | * | 6/2017 | |

(Continued)

OTHER PUBLICATIONS

Gauglitz et al., Evaluation of Interest Point Detectors and Feature Descriptors for Visual Tracking, International Journal of Computer Vision, Mar. 2011, pp. 335-360 (2011), doi.org/10.1007/s11263-011-0431-5.*

*Primary Examiner* — Guillermo M Rivera-Martinez
(74) *Attorney, Agent, or Firm* — Cozen O'Connor (57) ABSTRACT

A motion-detection method includes for a motion-detection region in a first image of a scene, (i) determining a respective first pixel-value gradient at each of a plurality of pixel-coordinates within the motion-detection region, and (ii) determining a first feature-descriptor value as a function of the first pixel-value gradients and position vectors defined by the plurality of pixel-coordinates. The method also includes, for the motion-detection region in a second image of the scene, (i) determining a respective second pixel-value gradient at each of the plurality of pixel-coordinates, and (ii)

(Continued)

determining a second feature-descriptor value as a function of the second pixel-value gradients and the position vectors. The method also includes determining a difference-parameter that varies in direct relationship to a difference between the first feature-descriptor value and the second feature-descriptor value.

19 Claims, 4 Drawing Sheets

(56) References Cited

U.S. PATENT DOCUMENTS

| | | | | |
|---|---|---|---|---|
| 2011/0299782 A1* | 12/2011 | Hamsici | ............... | G06V 10/462 |
| | | | | 382/195 |
| 2012/0229677 A1* | 9/2012 | Ugawa | ................. | H04N 23/951 |
| | | | | 348/E9.037 |
| 2014/0333775 A1* | 11/2014 | Naikal | ............. | H04N 21/44008 |
| | | | | 348/159 |
| 2015/0049955 A1* | 2/2015 | Stoeffler | ................. | G06F 18/22 |
| | | | | 382/220 |
| 2015/0154468 A1* | 6/2015 | Li | ............................. | G06T 5/20 |
| | | | | 382/197 |
| 2018/0268237 A1* | 9/2018 | Stanimirovic | ........... | G06T 7/248 |
| 2021/0004589 A1* | 1/2021 | Turkelson | ......... | G06V 30/19173 |
| 2021/0021833 A1* | 1/2021 | Hong | ................... | H04N 19/521 |

FOREIGN PATENT DOCUMENTS

| | | | | | |
|---|---|---|---|---|---|
| CN | 107194366 A | * | 9/2017 | ......... | G06K 9/00711 |
| CN | 110782477 A | * | 2/2020 | ............. | G06T 7/207 |

* cited by examiner

MOTION DETECTION SYSTEM AND METHOD

CROSS-REFERENCE TO RELATED APPLICATIONS

This application claims the benefit of U.S. Provisional Application No. 63/164,111, filed Mar. 22, 2021, the entirety of which is incorporated herein by reference.

BACKGROUND

Motion detection is a critical step for a security/surveillance system, and must detect events of interest/importance without triggering false positives. Surveillance systems detect motion by calculating "feature descriptors" of video frames. Feature descriptors probe signal changes over time during a video frame sequence. Among most widely used feature descriptors are scale-invariant feature transforms (SIFT), speeded up robust features (SURF), and histogram of oriented gradients (HOG).

These descriptors use sample gradients, as do other computer vision analysis methods such as AI based approaches. Gradients represent orientation and magnitude of sample value changes at each sample location on each video frame. The direction of the sample gradient shows orientation of sample change. The length of the sample gradient shows magnitude of sample change. Gradients become larger along object edges and smaller in flat regions. They can provide visual signatures unique to each frame.

Conventional gradient-based feature descriptors, SIFT, SURF and HOG included, sometimes suffer from a poor SNR in smooth areas, which results in increased false detections. The problem often occurs when objects are executing a translational movement in dark or dim scenes. The problem poses a challenge for their use in motion detection.

SUMMARY OF THE EMBODIMENTS

An image, or frame, is an array of pixel values, in which each pixel value has been generated, or derived from, a respective pixel of a pixel array. The pixel array is part of an image sensor located at a focal plane of a camera. The array of pixel values can be divided into motion-detection regions, or subarrays of pixel-coordinates. Each pixel-coordinate is associated with a respective pixel-value. Feature descriptors may be defined for each motion-detection region of the image. For each motion-detection region, the feature descriptor value of that motion-detection region may be a function of pixel-value gradients of each pixel of the motion-detection region. For a motion-detection region with N pixel-coordinates, a general form of the function is $D(\vec{g}_1, \vec{g}_2, \vec{g}_3, \ldots, \vec{g}_N)$, where $\vec{g}_k$ is a pixel-value gradient at pixel-coordinate indexed by k. Embodiments disclosed herein remedy problems of conventional gradient-based feature descriptors, by incorporating position information and gradient values into feature descriptors.

In a first aspect, a motion-detection method includes: for a motion-detection region in a first image of a scene, (i) determining a respective first pixel-value gradient at each of a plurality of pixel-coordinates within the motion-detection region, and (ii) determining a first feature-descriptor value as a function of the first pixel-value gradients and position vectors defined by the plurality of pixel-coordinates. The method also includes, for the motion-detection region in a second image of the scene, (i) determining a respective second pixel-value gradient at each of the plurality of pixel-coordinates, and (ii) determining a second feature-descriptor value as a function of the second pixel-value gradients and the position vectors. The method also includes determining a difference-parameter that varies in direct relationship to a difference between the first feature-descriptor value and the second feature-descriptor value.

In a second aspect, a motion detection system includes circuitry that executes the method of the first aspect.

In a third aspect, a non-transitory computer readable medium stores instructions, that when executed by a processor, cause the processor to execute the method of the first aspect.

DETAILED DESCRIPTION OF THE EMBODIMENTS

Figure 1:
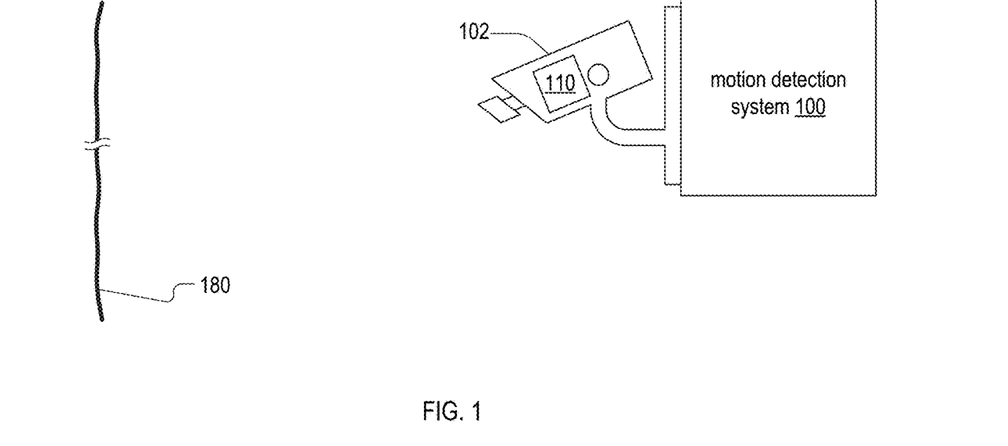
FIG. 1 is a schematic of a camera imaging a scene.

FIG. 1 is a schematic of a camera 102 imaging a scene 180. Camera 102 may be a security camera, and includes an image sensor 110. Image sensor 110 is communicatively coupled to a motion detection system 100, which in embodiments includes at least one of image sensor 110 and camera 102. In embodiments, motion detection system 100 is part of image sensor 110.

Figure 2:
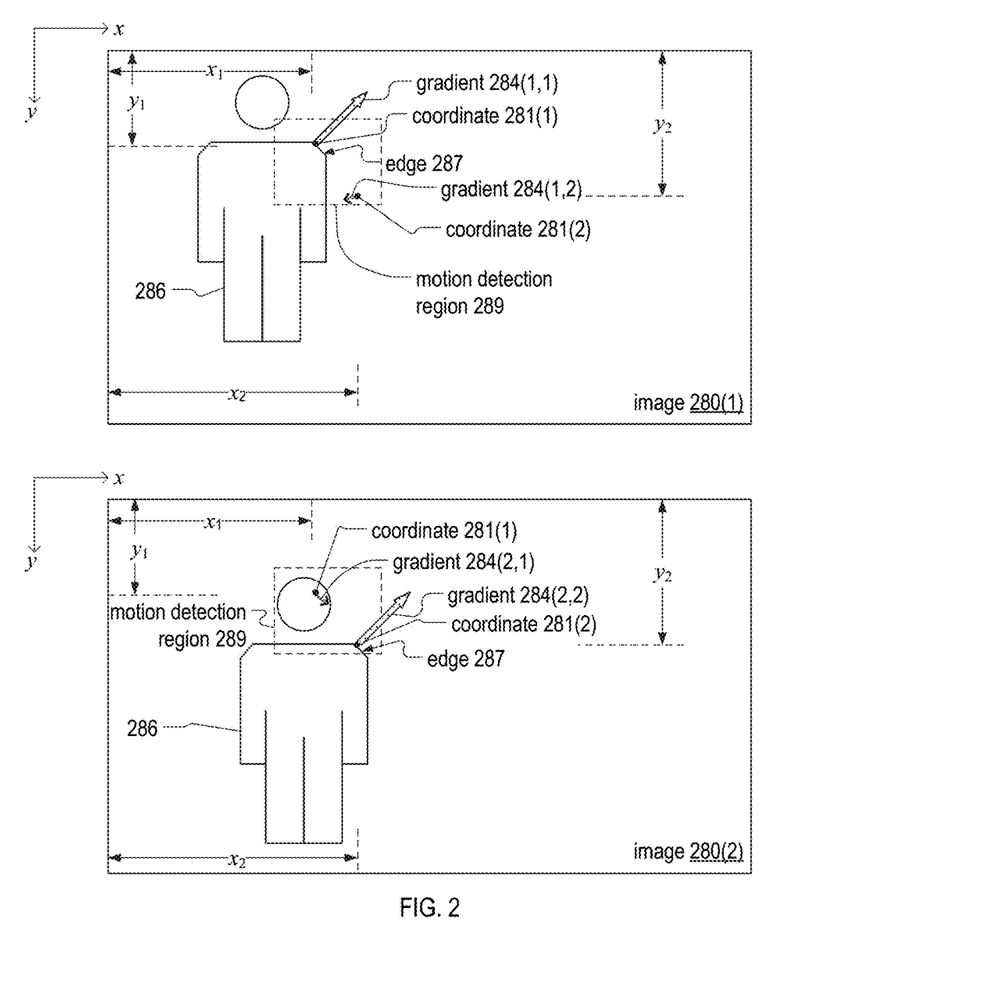
FIG. 2 is a schematic of images captured by the camera of FIG. 1 at different times.
Figure 3:
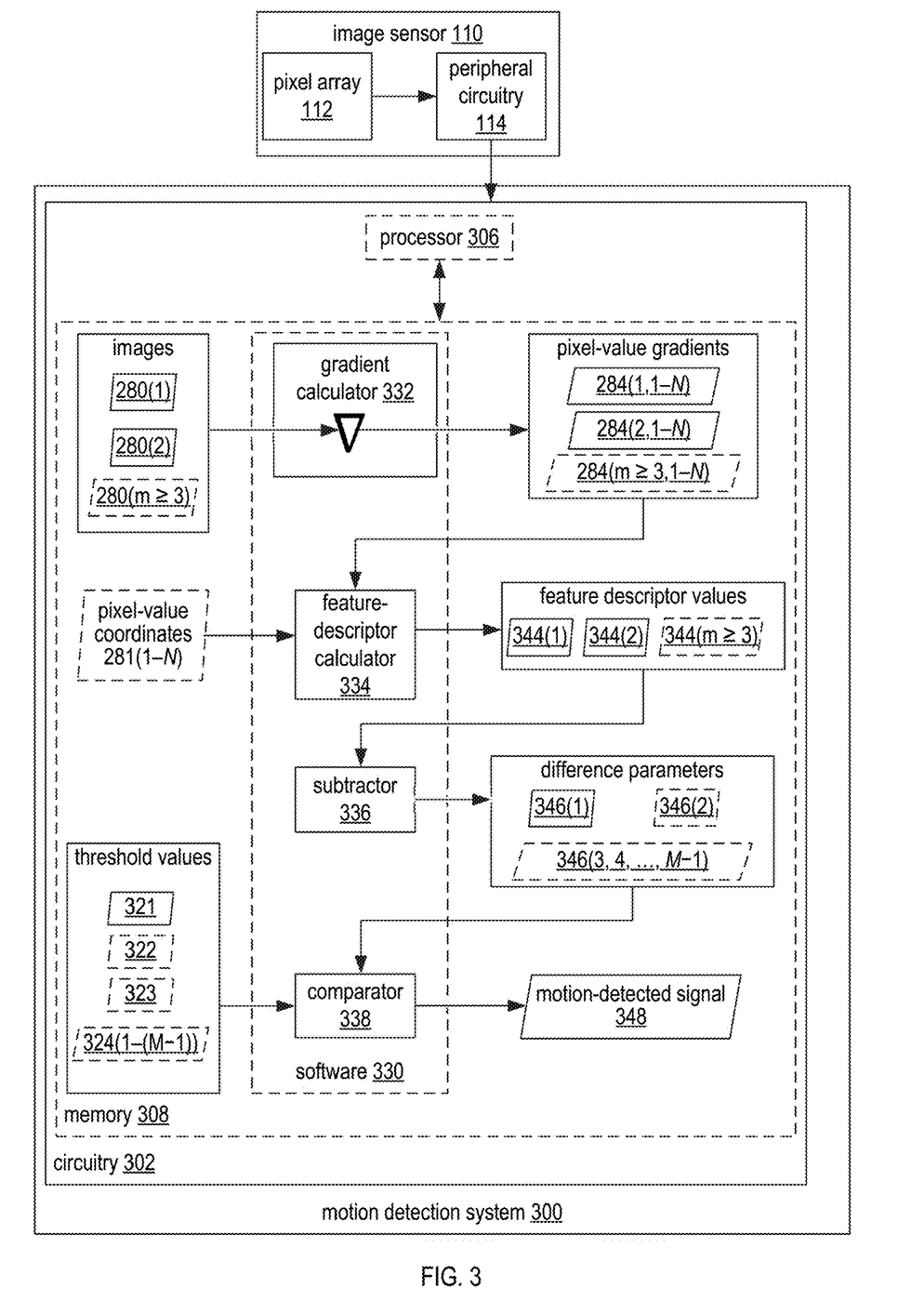
FIG. 3 is a schematic of a motion detection system configured to detect motion in the images of FIG. 2, in an embodiment.

FIG. 2 is a schematic of images 280(1) and 280(2) of scene 180 captured by camera 102 at respective times T and (T−δT), such that image 280(2) was captured before image 280(1). FIG. 3 is a schematic of a motion detection system 300, which is an example of motion detection system 100, and may be communicatively coupled to image sensor 110. FIGS. 2 and 3 are best viewed together in the following description.

Motion detection system 300 includes circuitry 302 that implements functionality of motion detection system 300. In embodiments, circuitry 302 includes a processor 306 and a memory 308. Memory 308 stores images 280 and software 330. Software 330 includes machine readable instructions that are executed by processor 306 to implement functionality of motion detection system 300. Software 330 includes a gradient calculator 332, a feature-descriptor calculator 334, a subtractor 336, and a comparator 338.

In embodiments, circuitry 302 is, or includes (as processor 306 for example), an integrated circuit, such as an application-specific integrated circuit and a field-programmable gate array. In such embodiments, circuitry 302 may include memory 308, in which memory 308 does not include software 330. Rather, the integrated circuit executes the functionality of software 330, e.g., that of gradient calculator 332, feature-descriptor calculator 334, subtractor 336, and comparator 338 described herein.

Memory 308 may be transitory and/or non-transitory and may include one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). Part or all of memory 308 may be integrated into processor 306.

Image sensor 110 includes a pixel array 112 and circuitry 114, which may include circuitry 302. In an example mode of operation, pixel array 112 generates signals from images formed by optical elements of camera 102. Circuitry 114 is communicatively coupled to pixel array 112 and outputs a plurality of pixel values, representing the signals, which memory 308 stores as images 280(1) and 280(2). Images 280(1) and 280(2) may be either consecutive images or nonconsecutive images captured by camera 102.

Each of images 280 includes a motion-detection region 289, which includes N pixel-coordinates 281(1, 2, . . . , N), hereinafter also pixel-coordinates 281(1-N) and pixel-coordinates 281. Two of these coordinates are pixel-coordinates 281(1) and 281(2). The shape formed by the plurality of pixel-coordinates may determine the shape of motion-detection region 289. The shape may be polygonal, such as triangular, hexagonal, or, as in the example of FIG. 2, rectangular. Memory 308 may store pixel-coordinates 281, which may be stored as metadata of one or more images 280.

Pixel-coordinates 281(1) and 281(2) define respective position vectors $\vec{r}_1=(x_1,y_1)$ and $\vec{r}_2=(x_2,y_2)$. At pixel-coordinate 281(1), images 280(1) and 280(2) have respective pixel gradients 284(1,1) and 284(2,1), where the first number in parenthesis denotes the index of image 280, and the second number denotes the index of pixel-coordinate 281. Similarly, at pixel-coordinate 281(2), images 280(1) and 280(2) have respective pixel gradients 284(1,2) and 284(2, 2).

In an image 280, pixel-value gradient 284 at $(x_1,y_1)$ is a function of the pixel-value at $(x_1,y_1)$ and pixel-values at adjacent pixel-coordinates. Similarly, pixel-value gradient 284 at $(x_2,y_2)$ is a function of the pixel-value at $(x_2,y_2)$ and pixel-values at adjacent pixel-coordinates.

For each pixel coordinate 281(k) in motion-detection region 289 of image 280(1), gradient calculator 332 determines (a) a respective pixel-value gradient 284(1,k) of image 280(1). Similarly, for each pixel coordinate 281(k) in motion-detection region 289 of image 280(2), gradient calculator 332 determines (a) a respective pixel-value gradient 284(2,k) of image 280(2). When memory 308 stores additional images 280($m \geq 3$), gradient calculator 332 may determine a respective set of pixel value gradients 284($m$,1-N).

Each image 280 includes an image of an object 286 in scene 180. The image of object 286 has an edge 287. In image 280(1), edge 287 is at pixel-coordinate 281(1), whereas at pixel-coordinate 281(2), there is no image of an object edge, or of other features associated with a large pixel-value gradient. Consequently, a magnitude $|\vec{g}_1(x_1,y_1)|$ of pixel gradient 284(1,1) is larger than a magnitude $|\vec{g}_1(x_2,y_2)|$ of pixel gradient 284(1,2). Between times (T–δT) and T, object 286 moved such that in image 280(2), object edge 287 is at pixel-coordinate 281(2), whereas at pixel-coordinate 281(1), there is no image of an object edge, or of other features associated with a large pixel-value gradient).

Assuming a uniform background in scene 180, gradient 284(2,2) is equal to gradient 284(1,1). Hence, a feature descriptor that accounts for only pixel-value gradients within motion-detection region 289 will have the same value in both images 280(1) and 280(2), despite motion having occurred in scene 180 between capture of these images. A motion detection system that relies on such a feature descriptor would not detect such motion. Mathematically, a feature descriptor of motion-detection region 289 may be expressed as $\vec{D}=\Sigma_{k=1}^{N}\phi(\vec{g}_k)$, hereinafter equation (1), where $\phi$ is a function of pixel-value gradient $\vec{g}_k$ and each pixel-coordinate is indexed by a respective integer value of index k.

In motion detection system 300, feature-descriptor calculator 334 generates feature-descriptor values 344 from pixel-value coordinates 281 and pixel-value gradients 284. Since feature-descriptor calculator 334 accounts for both pixel-value gradients and their associated pixel-coordinates, motion detection system 300 detects the motion of object 286 occurring between capture of images 280(1) and 280(2).

Feature-descriptor values 344 may be expressed as a vector $\vec{D}=(D_x,D_y)$. In embodiments, $\vec{D}=\Sigma_{k=1}^{N}f_1(\vec{g}_k,\vec{r}_k)$ hereinafter equation (2). Feature-descriptor values 344 may be a scalar without departing from the scope of the embodiments presented herein. In embodiments, function $f_1$ is a multiplicatively separable function: $f_1(\vec{g}_k,\vec{r}_k)=\gamma(\vec{g}_k)\rho(\vec{r}_k)$, where each of $\gamma(\vec{g}_k)$ and $\rho(\vec{r}_k)$ may be monotonically increasing functions of their respective arguments.

More generally, function $f_1$ includes two separate arguments, gradient $\vec{g}_k$ and position vector $\vec{r}_k$. In embodiments, function $f_1$ has a form where position vector $\vec{r}_k$ is multiplied (weighted) by a magnitude $g_k$ of pixel-value gradient $\vec{g}_k$, such that the pixel-value gradient and pixel-coordinate form a single argument to function $f_1$: $f_1(|\vec{g}_k|\vec{r}_k)$. Function $f_1$ may be a monotonically increasing function of its argument. In such embodiments, feature-descriptor value 344 may be expressed as a weighted sum of position vectors: $\vec{D}=\Sigma_{k=1}^{N}f_1(|\vec{g}_k|\vec{r}_k)$, hereinafter equation (3).

In embodiments, the function $f_1$ is an identity function, such that the feature descriptor is a weighted sum position vector: $\vec{D}=\Sigma_{k=1}^{N}|\vec{g}_k|\vec{r}_k$, hereinafter equation (4). In this example, vector components $(D_x,D_y)$ are weighted sums of respective pixel-coordinates: $D_x=(g_1x_1+g_2x_2+ \ldots +g_Nx_N)$ and $D_y=(g_1y_1+g_2y_2+ \ldots +g_Ny_N)$. In embodiments, feature-descriptor calculator 334 generates feature-descriptor values 344 at least in part by implementing one of equations (2), (3), and (4).

Subtractor 336 outputs a difference parameter 346(1) based on descriptor values 344(1) and 344(2). Difference parameter 346(1) varies in direct relationship to a difference between feature-descriptor values 344(1) and 344(2). That is, difference parameter 346(1) both (a) increases as the difference increases, and (b) decreases as the difference decreases. Subtractor 336 may also output additional difference parameters 346($m \geq 2$) based on a pair of descriptor values 344, in which the additional difference parameter 346 varies in direct relationship to a difference between the pair of feature-descriptor values 344 used to generate it.

Since images 280(1) and 280(2) were captured at respective times T and (T–δT), respective feature descriptor values 344(1) and 344(2) may be expressed as $\vec{D}(T)$ and $\vec{D}(T-\delta T)$. Difference parameter 346(1) may be expressed as a function of both $\vec{D}(T)$ and $\vec{D}(T-\delta T)$: $DP_{346(1)}=f_2(\vec{D}(T),\vec{D}(T-\delta T))$, hereinafter equation (5). More generally, difference parameter 346 may be proportional to function $f_2$ raised to a power, e.g., $DP_{346(1)} \propto f_2^2$.

Function $f_2$ may be a monotonically increasing function of its arguments, e.g., of a difference between feature-descriptor values $\vec{D}(T)$ and $\vec{D}(T-\delta T)$. For example, function $f_2$ may be expressed by equation (6).

$$f_2\big(\vec{D}(T-\delta T), \vec{D}(T)\big) = \big((D_x(T) - D_x(T-\delta T))^2 + (D_y(T) - D_y(T-\delta T))^2\big)^{\frac{1}{2}} \quad (6)$$

Memory 308 stores a threshold value 321 that determines a sensitivity of motion detection system 300. Comparator 338 outputs motion-detected signal 348 when difference parameter 346 exceeds threshold value 321.

In embodiments, motion detection system 300 determines presence of motion in scene 180 based on additional difference parameters 346 determined from additional images 280. In a first example, motion detection system 300 determines one additional difference parameter 346(2) in part from an image 280(3). In a second example, motion detection system 300 determines multiple additional difference parameters 346($m \geq 3$) in part from images 280($m \geq 3$).

In a first example, memory 308 stores image 280(3) captured at (T–δT'), and gradient calculator 332 outputs pixel value gradients 284(3,1-N). Time interval δT' may exceed time interval ST, such that images 280(1-3) are temporally consecutive. Feature-descriptor calculator 334 outputs a feature descriptor value 344(3) from pixel value gradients 284(3,1-N) and pixel-value coordinates 281(1-N). Feature descriptor value 344(3) may be expressed as $\vec{D}(T-\delta T')$.

Subtractor 336 determines a difference parameter 346(2) from feature descriptor values 344(1) and 344(3). For example, difference parameter $DP_{346(2)} = f_2(\vec{D}(T-\delta T'), \vec{D}(T))$, hereinafter equation (7). In equation (7), function $f_2$ may have the form of equation (6), where δT' replaces δT, as shown in equation (8).

$$f_2\big(\vec{D}(T-\delta T'), \vec{D}(T)\big) = \big((D_x(T) - D_x(T-\delta T'))^2 + (D_y(T) - D_y(T-\delta T'))^2\big)^{\frac{1}{2}} \quad (8)$$

Motion detection system 300 may determine presence of motion by evaluating both difference parameters 346(1) and 346(2). Without departing from the scope hereof, subtractor 336 may determine difference parameter 346(2) from feature descriptor values 344(2) and 344(3), instead of from descriptor values 344(1) and 344(3).

In this first example, comparator 338 may output motion-detected signal 348 when either (i) at least one, (ii) at least two, or (iii) all three of the following three conditions are satisfied. The first condition is that difference-parameter 346(1) exceeds threshold value 321. The second condition is that difference-parameter 346(2) exceeds a threshold value 322 stored in memory 308. The third condition is that a function of difference-parameter 346(1) and difference-parameter 346(2), e.g., a ratio of the difference-parameters, exceeds a threshold value 323 stored in memory 308.

In the second example, memory 308 stores images 280 (1,2) and also images 280(3-M), captured at respective times preceding (T–δT), where M≥3. Images 280(3-M) may be temporally sequential, and also be temporally consecutive. The number of images 280(3-M) is (M–2), e.g., when M=5, images 280(3-M) denotes images 280(3), 280(4), and 280 (5).

Gradient calculator 332 outputs M groups of N pixel-value gradients 284(1,1-N), 284(2,1-N), . . . , 284(M,1-N). For each of the M images 280, feature-descriptor calculator 334 outputs a respective feature descriptor value 344($m$) from pixel value gradients 284($m$,1-N) and pixel-value coordinates 281(1-N).

For each pair of temporally consecutive feature descriptor values 344 (corresponding to a pair of temporally consecutive images 280), subtractor 336 determines a respective difference parameter 346. Hence, for M feature descriptor values 344, subtractor 336 determines (M–1) difference parameters 346(1, 2, . . . , M–1).

Comparator 338 may output motion-detected signal 348 when one or both of the following two conditions are satisfied. First, a function of difference parameters 346(1, 2, . . . , M–1) exceeds threshold value 321, and (b) each of difference parameters 346(1, 2, . . . , M–1) exceeds a respective one of a plurality of threshold values 324(1, 2, . . . , M–1) stored in memory 308. The function may be one of the following, where the argument to the function is difference parameters 346(1, 2, . . . , M–1): a mean, an inverse of a variance, a maximum, a minimum, and a quotient of the minimum and the maximum. Threshold values 324 may include at least one of threshold values 321, 322, and 323.

Figure 4:
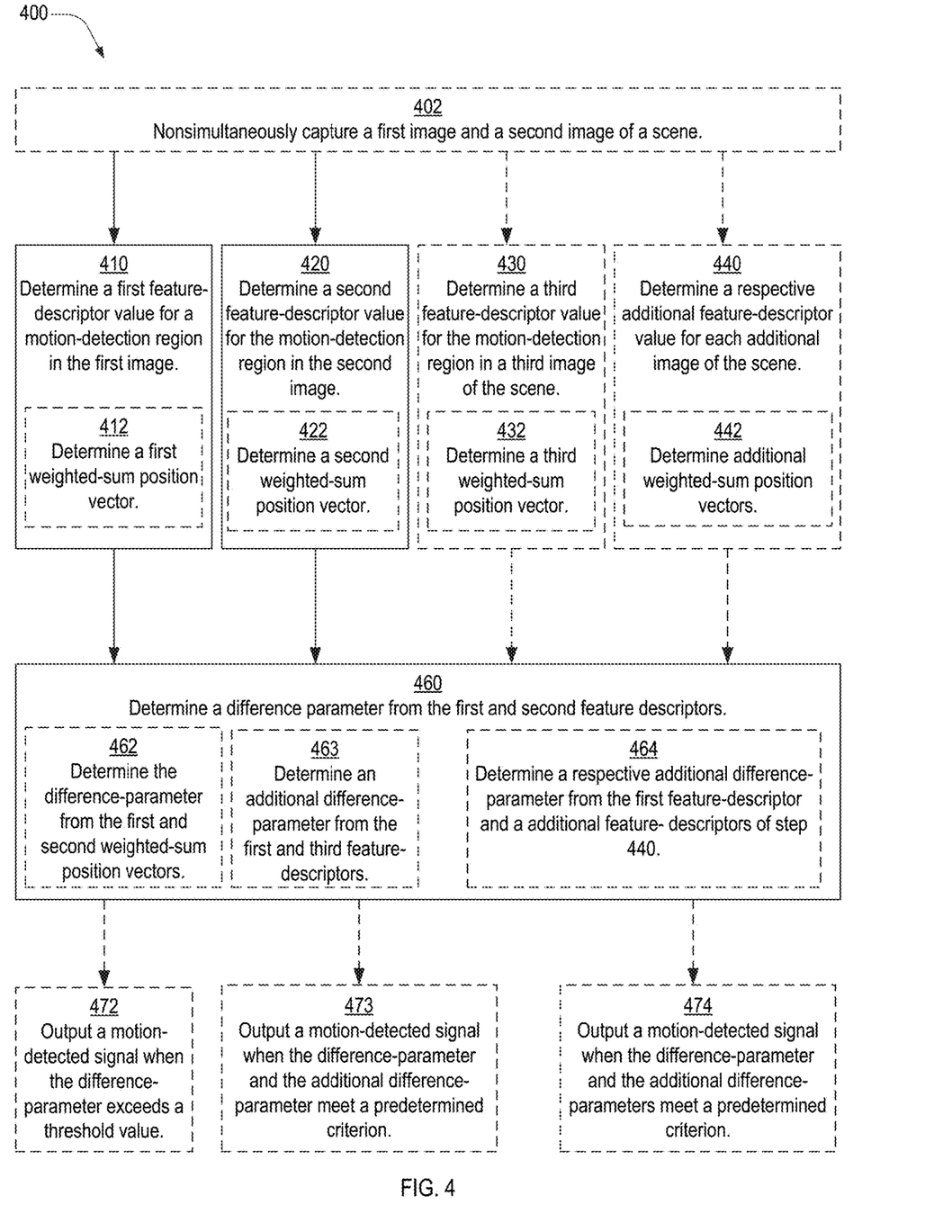
FIG. 4 is a flowchart illustrating a motion detection method, in an embodiment.

FIG. 4 is a flowchart illustrating a motion detection method 400. In embodiments, processor 306 implements motion detection method 400 by executing computer-readable instructions of software 330. Method 400 includes steps 410, 420, and 460. Method 400 may also include at least one of steps 402, 430, 440, 472, 473, and 474. The following description of method 400 concerns a motion-detection region of a scene. Method 400 may be performed for additional motion-detection regions of the scene.

Step 402 includes nonsimultaneously capturing a first image and a second image of a scene. In an example of step 402, camera 102 captures images 280(1) and 280(2). Camera 102 may capture any number of images 280 from a same vantage point, such that differences between any two images 280 are caused by changes in scene 180, rather than from camera motion.

Step 410 includes, for a motion-detection region in a first image of a scene, (i) determining a respective first pixel-value gradient at each of a plurality of pixel-coordinates within the motion-detection region, and (ii) determining a first feature-descriptor value as a function of the first pixel-value gradients and position vectors defined by the plurality of pixel-coordinates. In an example of step 410, gradient calculator 332 determines pixel-value gradients 284(1,1-N) from motion-detection region 289 of image 280(1). Also in this example, feature-descriptor calculator 334 determines feature-descriptor value 344(1) as a function of pixel-value gradients 284(1,1-N) and pixel-coordinates 281.

Step 410 may include step 412. Step 412 includes determining, for the first image, a first weighted-sum position vector by: for each coordinate of the plurality of pixel-coordinates, determining a respective first weighted position vector equal to a first function of (i) a position vector defined by the coordinate and (ii) a magnitude of the first pixel-value gradient at the coordinate. Step 412 also includes, when determining the first feature-descriptor value, summing the first weighted position vectors to yield the first weighted-sum position vector. In an example of step 412, feature-descriptor calculator 334 determines feature-descriptor value 344(1) at least in part by implementing one of equations (3) and (4) to yield a weighted-sum position vector $\vec{D}$, where in function $f_1$, each gradient vector $\vec{g}_k$ is a respective pixel-value gradient 284(1,1-N), and each vector $\vec{r}_k$ is a respective vector defined by a pixel-coordinate 281.

Step 420 includes, for the motion-detection region in a second image of the scene, (i) determining a respective second pixel-value gradient at each of the plurality of pixel-coordinates, and (ii) determining a second feature-descriptor value as a function of the second pixel-value gradients and the position vectors. In an example of step 420, gradient calculator 332 determines pixel-value gradients 284(2,1-N) from motion-detection region 289 of image 280(2). Also in this example, feature-descriptor calculator 334 determines feature-descriptor value 344(2) as a function of pixel-value gradients 284(2,1-N) and pixel-coordinates 281.

Step 420 may include step 422. Step 422 includes determining, for the second image, a second weighted-sum position vector by: (a) for each of coordinate of the plurality of pixel-coordinates, determining a respective second weighted position vector equal to the first function of (i) a position vector defined by the coordinate and (ii) a magnitude of the second pixel-value gradient at the coordinate; and (b) when determining the second feature-descriptor value, summing the second weighted position vectors to yield the second weighted-sum position vector. In an example of step 422, feature-descriptor calculator 334 determines feature-descriptor value 344(2) at least in part by implementing one of equations (3) and (4) to yield weighted-sum position vector $\vec{D}$, where in function $f_1$, each gradient vector $\vec{g}_k$ is a respective pixel-value gradient 284 (2,1-N), and each vector $\vec{r}_k$ is a respective vector defined by a pixel-coordinate 281.

Step 430 includes, for the motion-detection region in a third image of the scene, (i) determining a respective third pixel-value gradient at each of the plurality of pixel-coordinates, and (ii) determining a third feature-descriptor value as a function of the third pixel-value gradients and the position vectors. In an example of step 430, gradient calculator 332 determines pixel-value gradients 284(3,1-N) from motion-detection region 289 of image 280(3). Also in this example, feature-descriptor calculator 334 determines feature-descriptor value 344(3) as a function of pixel-value gradients 284(3,1-N) and pixel-coordinates 281.

Step 430 may include step 432, which is equivalent to step 422 as applied to the third image instead of the second image. In an example of step 432, feature-descriptor calculator 334 determines feature-descriptor value 344(3) at least in part by implementing one of equations (3) and (4), where in function $f_1$, each gradient vector $\vec{g}_k$ is a respective pixel-value gradient 284(3,1-N), and each vector $\vec{r}_k$ is a respective vector defined by a pixel-coordinate 281.

Step 440 includes, for each of a plurality of additional images of the scene, (i) determining an additional pixel-value gradient at each of the plurality of pixel-coordinates of the motion-detection region in the additional image, and (ii) determining an additional feature-descriptor value as a function of the additional pixel-value gradients and the position vectors. In an example of step 440, for each of images 280(m) where m={2, 3, ..., M} (i) gradient calculator 332 determines pixel-value gradients 284(m, 1-N) from motion-detection region 289 of image 280(m). Also in this example, feature-descriptor calculator 334 determines feature-descriptor value 344(m) as a function of pixel-value gradients 284(m,1-N) and pixel-coordinates 281.

Step 440 may include step 442, which is equivalent to step 422 as applied to the $m^{th}$ image instead of the second image. In an example of step 442, feature-descriptor calculator 334 determines, for each image 280(m=3, 4, ..., M), a respective feature-descriptor value 344(m) at least in part by implementing one of equations (3) and (4), where in function $f_1$, each gradient vector $\vec{g}_k$ is a respective pixel-value gradient 284(m,1-N), and each vector $\vec{r}_k$ is a respective vector defined by a pixel-coordinate 281.

Step 460 includes determining a difference-parameter that varies in direct relationship to a difference between the first feature-descriptor value and the second feature-descriptor value. In a first example of step 460, subtractor 336 determines difference-parameter 346(1). Step 460 may include step 463, e.g., when method 400 includes step 430. In an example of step 463, subtractor 336 determines difference-parameters 346(1) and 346(2). Step 460 may include step 464, e.g., when method 400 includes step 440. In an example of step 464, when method 400 includes step 430, subtractor 336 determines difference-parameters 346(1), 346(2), and also difference-parameters 346(3, 4, ..., M-1).

When method 400 includes steps 412 and 422, step 460 may include step 462. Step 462 includes determining the difference-parameter from the first and second weighted-sum position vectors such that the difference-parameter varies in direct relationship to a difference between the first and second weighted-sum position vectors. In an example of step 462, subtractor 336 determines difference-parameter 346(1) from the first and second weighted-sum position vectors as determined by either equation (3) or (4), as described in the above example of step 412.

When method 400 includes both steps 412 and 432, step 460 may include, as part of step 463, determining the additional difference parameter from the first and third weighted-sum position vector. When step 440 includes step 442, step 460 may include (as part of step 464) determining each additional difference parameter 346(m=2, 3, ..., M-1), from the first weighted-sum position vector and the corresponding additional weighted-sum position vector determined in step 442 from pixel value gradient 284(m).

Each of steps 472, 473, and 474 include outputting a motion-detected signal. In embodiments, method 400 excludes steps 430 and 440, and includes step 472. In embodiments, method 400 includes each of steps 430, 463, and 473. In embodiments, method 400 includes each of steps 440, 464, and 474.

Step 472 includes outputting a motion-detected signal when the difference-parameter exceeds a threshold value. In an example of step 472, comparator 338 outputs motion-detected signal 348 when difference parameter 346(1) exceeds threshold value 321.

Step 473 includes outputting a motion-detected signal when at least one of (i) the difference-parameter exceeds a threshold value, (ii) the additional difference-parameter exceeds a first additional threshold value, and (iii) a quotient of the difference-parameter and the additional difference-parameter exceeds a second additional threshold value. In an example of step 473, comparator 338 outputs motion-detected signal 348 when at least one of (i) difference parameter 346(1) exceeds threshold value 321, (ii) difference-parameter 346(2) exceeds threshold value 322, and (iii) a quotient of difference-parameter 346(1) and difference-parameter 346(2) exceeds threshold value 323.

Step 474 includes outputting a motion-detected signal when at least one of (a) a function of the difference-parameter and each of the additional difference-parameters exceeds a threshold value, and (b) the difference-parameter exceeds a threshold value and each of the additional difference-parameters exceeds a respective additional threshold value. In an example of step 473, comparator 338 outputs motion-detected signal 348 when at least one of (a) a function of difference-parameters 346(1, 2, . . . , M−1) exceeds one of threshold values 321-323, and (b) difference-parameter 346(m) exceeds threshold value 324(m) for each of m=1, 2, . . . , (M−1).

Figure 5:
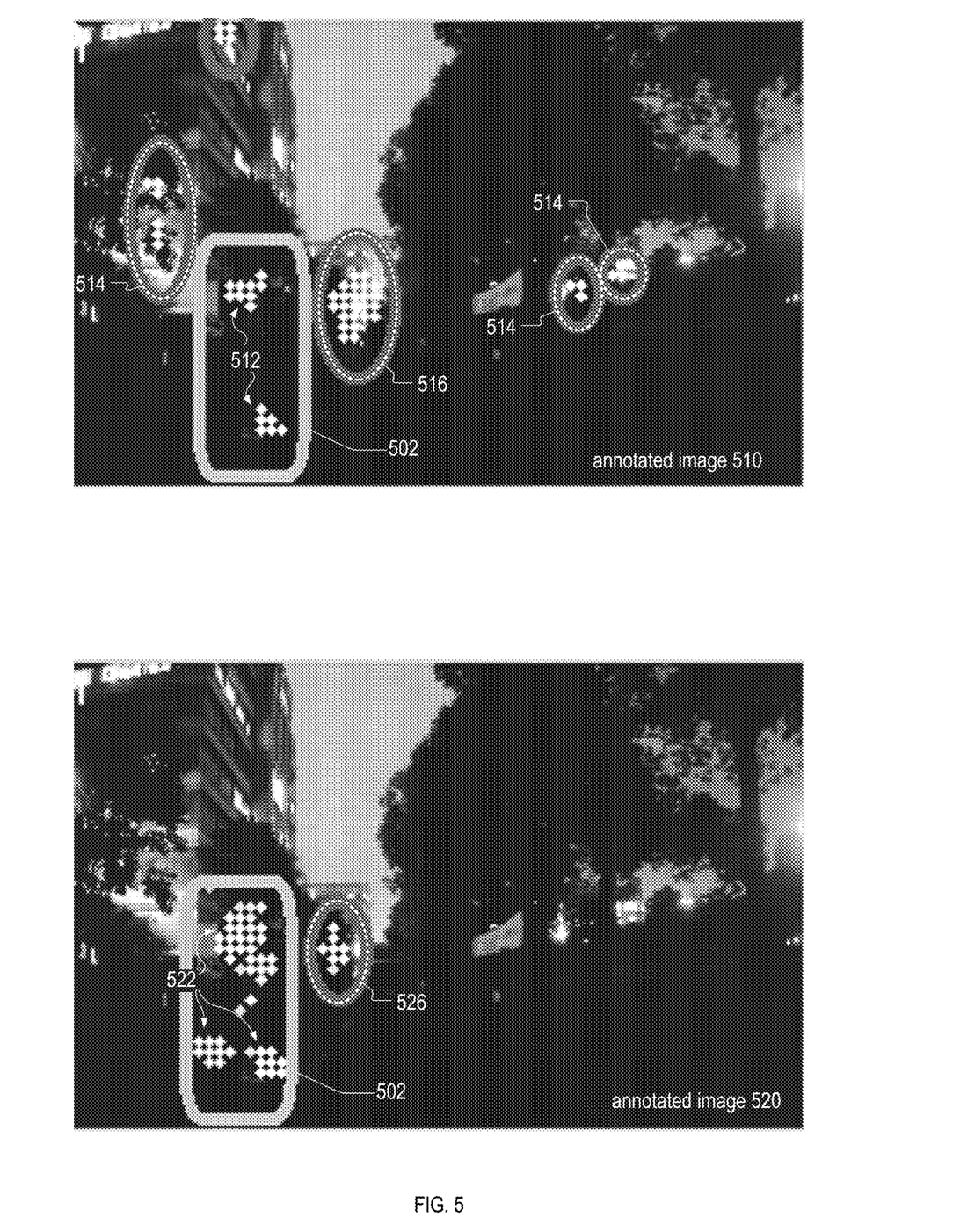
FIG. 5 includes annotated images that illustrate the benefits of the motion-detection system and method compared to a conventional motion-detection method.

FIG. 5 includes annotated images 510 and 520, which illustrate the benefits of motion detection system 300 and method 400 compared to a conventional motion-detection method. Annotated images 510 and 520 include respective annotations of the same image of a poorly illuminated scene where a person is walking in a scene region 502. Annotations of image 510 are generated using a HOG feature descriptor. Annotations of annotated image 520 are generated using feature descriptors used by motion detection system 300 and method 400, which depend on both pixel-value gradients and the pixel-value coordinates.

Motion indicators of annotated images 510 and 520 are denoted by white diamonds. In scene region 502, annotated images 510 and 520 includes true-positive motion indicators 512 and 522 respectively. True-positive motion indicators 522 are more numerous, and more clearly reveal the person's motion, than motion indicators 512. Indicators 522 correspond to the person's head, torso, and feet, whereas indicators 512 are relatively sparse, and do not include indicators at the person's torso or legs.

Annotated image 510 includes false positives 514 that are not present in annotated image 520. While both annotated images 510 and 520 include respective false-positive indicators 516 and false positive indicators 526 in a same image region, the number of false positive indicators 526 is significantly less than those of false-positive indicators 516.

Combination of Features

Features described above as well as those claimed below may be combined in various ways without departing from the scope hereof. The following enumerated examples illustrate some possible, non-limiting combinations:

(A1) A motion-detection method includes for a motion-detection region in a first image of a scene, (i) determining a respective first pixel-value gradient at each of a plurality of pixel-coordinates within the motion-detection region, and (ii) determining a first feature-descriptor value as a function of the first pixel-value gradients and position vectors defined by the plurality of pixel-coordinates. The method also includes, for the motion-detection region in a second image of the scene, (i) determining a respective second pixel-value gradient at each of the plurality of pixel-coordinates, and (ii) determining a second feature-descriptor value as a function of the second pixel-value gradients and the position vectors. The method also includes determining a difference-parameter that varies in direct relationship to a difference between the first feature-descriptor value and the second feature-descriptor value.

(A2) The embodiment (A1) further includes the method includes outputting a motion-detected signal when the difference-parameter exceeds a threshold value.

(A3) In either one of embodiments (A1) and (A2), the method includes determining, for the first image, a first weighted-sum position vector by: (a) for each coordinate of the plurality of pixel-coordinates, determining a respective first weighted position vector equal to a first function of (i) a position vector defined by the coordinate and (ii) a magnitude of the first pixel-value gradient at the coordinate; and (b) when determining the first feature-descriptor value, summing the first weighted position vectors to yield the first weighted-sum position vector; determining, for the second image, a second weighted-sum position vector by: (a) for each of coordinate of the plurality of pixel-coordinates, determining a respective second weighted position vector equal to the first function of (i) a position vector defined by the coordinate and (ii) a magnitude of the second pixel-value gradient at the coordinate; and (b) when determining the second feature-descriptor value, summing the second weighted position vectors to yield the second weighted-sum position vector; and determining the difference-parameter from the first and second weighted-sum position vectors such that the difference-parameter varies in direct relationship to a difference between the first and second weighted-sum position vectors.

(A4) In embodiments of any one of methods (A1)-(A4), when determining the first weighted-sum position vector, the first function is a monotonically increasing function of a product of the position vector and the magnitude of the first pixel-value gradient; and when determining the second weighted-sum position vector, the first function is the monotonically increasing function of a product of the position vector and the magnitude of the second pixel-value gradient.

(A5) In embodiments of method (A4), the monotonically increasing function is a product of (i) a first monotonically increasing function of one of the first and second pixel-value gradients and (ii) a second monotonically increasing function of the position vector.

(A6) In embodiments of any one of methods (A3)-(A5), the difference-parameter is a monotonically increasing function of the difference.

(A7) In embodiments of any one of methods (A3)-(A6), the difference-parameter is a monotonically increasing function of the difference squared.

(A8) Embodiments of any one of methods (A1)-(A7) further includes the method includes nonsimultaneously capturing the first image and the second image.

(A9) In embodiments of method (A8), nonsimultaneously capturing includes nonsimultaneously capturing the first image and the second image from a same vantage point.

(A10) Embodiments of any one of methods (A1)-(A9) further includes for the motion-detection region in a third image of the scene, (i) determining a respective third pixel-value gradient at each of the plurality of pixel-coordinates, and (ii) determining a third feature-descriptor value as a function of the third pixel-value gradients and the position vectors. Such embodiments also include determining an additional difference-parameter that varies in direct relationship to a difference between the third feature-descriptor value and one of the first and the second feature-descriptor values. Such embodiments also include outputting a motion-detected signal when at least one of (i) the difference-parameter exceeds a threshold value, (ii) the additional difference-parameter exceeds a first additional threshold value, and (iii) a quotient of the difference-parameter and the additional difference-parameter exceeds a second additional threshold value.

(A11) Embodiments of any one of methods (A1)-(A10) further includes for each of a plurality of additional images of the scene, determining a respective additional difference-parameter by: outputting a motion-detected signal when at least one of (a) a function of the difference-parameter and each of the additional difference-parameters exceeds a threshold value, and (b) the difference-parameter exceeds a threshold value and each of the additional difference-parameters exceeds a respective additional threshold value.

(A12) In embodiments of method (A11), the function is one of a mean, an inverse of a variance, a maximum, a minimum, and quotient of the minimum and the maximum.

(A13) Embodiments of any one of methods (A1)-(A12) further includes the method includes repeating the steps of claim 1 for an additional motion-detection region in the first image and the second image to yield an additional first feature-descriptor value, an additional second feature-descriptor value, and an additional difference-parameter between the additional first and second feature-descriptor values; and outputting a motion-detected signal when both (i) the difference-parameter exceeds a threshold value, and (ii) the additional difference-parameter exceeds an additional threshold value.

(A14) In embodiments of any one of methods (A1)-(A13), for each pixel-coordinate in the first image, each first pixel-value gradient is a function of a pixel-value at the coordinate and pixel-values at adjacent pixel-coordinates; and for each pixel-coordinate in the second image, each second pixel-value gradient is a function of a pixel-value at the coordinate and pixel-values at adjacent pixel-value coordinates.

(A15) In embodiments of any one of methods (A1)-(A14), the motion-detection region includes a sub-plurality of the plurality of pixel-coordinates.

(B1) A motion detection system includes circuitry that executes any one of methods (A1)-(A15).

(B2) In embodiments of motion detection system (B1), the circuitry includes one of an application-specific integrated circuit and a field-programmable gate array.

(B3) In embodiments of either one of motion detection systems (B1) and (B2), the circuitry includes a processor and a memory storing a first image and a second image of a scene and machine readable instructions. When executed by the processor, the machine readable instructions cause the processor to execute the method of any one of embodiments (A1)-(A15).

(B4) Embodiments of any one of motion detection systems (B1)-(B3) further include an image sensor, communicatively coupled to the circuitry, that records the first image and the second image.

(B5) Any one of embodiments (B1)-(B4) further include a camera that includes the image sensor, that captures the first image and the second image.

(C1) A non-transitory computer readable medium stores instructions, that when executed by a processor, cause the processor to execute the method of claim 1.

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

What is claimed is:

1. A motion-detection method, comprising:
   determining a first weighted-sum position vector by:
   (a) determining a respective first pixel-value gradient at each of a plurality of pixel-coordinates within a motion-detection region of a first image of a scene,
   (b) for each coordinate of the plurality of pixel-coordinates, determining a respective first weighted position vector equal to a first function of (i) a position vector defined by the coordinate and (ii) a magnitude of the first pixel-value gradient at the coordinate; and
   (c) summing the first weighted position vectors to yield the first weighted-sum position vector
   determining a second weighted-sum position vector by:
   (a) determining a respective second pixel-value gradient at each of the plurality of pixel-coordinates within the motion-detection region of a second image of the scene,
   (b) for each of coordinate of the plurality of pixel-coordinates, determining a respective second weighted position vector equal to the first function of (i) a position vector defined by the coordinate and (ii) a magnitude of the second pixel-value gradient at the coordinate; and
   (c) summing the second weighted position vectors to yield the second weighted-sum position vector; and
   determining a difference-parameter that varies in direct relationship to a difference between the first weighted-sum position vector and the second weighted-sum position vector.

2. The method of claim 1, further comprising outputting a motion-detected signal when the difference-parameter exceeds a threshold value.

3. The method of claim 1,
   when determining the first weighted-sum position vector, the first function being a monotonically increasing function of a product of the position vector and the magnitude of the first pixel-value gradient; and
   when determining the second weighted-sum position vector, the first function being the monotonically increasing function of a product of the position vector and the magnitude of the second pixel-value gradient.

4. The method of claim 3, the monotonically increasing function being a product of (i) a first monotonically increasing function of one of the first and second pixel-value gradients and (ii) a second monotonically increasing function of the position vector.

5. The method of claim 1, the difference-parameter being a monotonically increasing function of the difference.

6. The method of claim 1, the difference-parameter being a monotonically increasing function of the difference squared.

7. The method of claim 1, further comprising nonsimultaneously capturing each of the first image and the second image.

8. The method of claim 7, nonsimultaneously capturing comprising:
   nonsimultaneously capturing the first image and the second image from a same vantage point.

9. The method of claim 1, further comprising:
   for the motion-detection region in a third image of the scene, (i) determining a respective third pixel-value gradient at each of the plurality of pixel-coordinates, and (ii) determining a third feature-descriptor value as a function of the third pixel-value gradients and the position vectors;
   determining an additional difference-parameter that varies in direct relationship to a difference between the third feature-descriptor value and one of the first and the second weighted sum position vector; and
   outputting a motion-detected signal when at least one of (i) the difference-parameter exceeds a threshold value, (ii) the additional difference-parameter exceeds a first additional threshold value, and (iii) a quotient of the difference-parameter and the additional difference-parameter exceeds a second additional threshold value.

10. The method of claim 1, further comprising:

for each of a plurality of additional images of the scene, determining a respective additional difference-parameter by:

(i) determining an additional pixel-value gradient at each of the plurality of pixel-coordinates of motion-detection region in the additional image, and (ii) determining an additional feature-descriptor value as a function of the additional pixel-value gradients and the position vectors; and determining an additional difference-parameter that varies in direct relationship to a difference between (i) the first weighted sum position vector and (ii) the additional feature-descriptor value; and outputting a motion-detected signal when at least one of (a) a function of the difference-parameter and each of the additional difference-parameters exceeds a threshold value, and (b) the difference-parameter exceeds a threshold value and each of the additional difference-parameters exceeds a respective additional threshold value.

11. The method of claim 10, the function being one of a mean, an inverse of a variance, a maximum, a minimum, and quotient of the minimum and the maximum.

12. The method of claim 1, further comprising:

repeating the steps of claim 1 for an additional motion-detection region in the first image and the second image to yield an additional first feature-descriptor value, an additional second feature-descriptor value, and an additional difference-parameter between the additional first and second feature-descriptor values; and outputting a motion-detected signal when both (i) the difference-parameter exceeds a threshold value, and (ii) the additional difference-parameter exceeds an additional threshold value.

13. The method of claim 1, for each pixel-coordinate in the first image, each first pixel-value gradient being a function of a pixel-value at the coordinate and pixel-values at adjacent pixel-coordinates; and for each pixel-coordinate in the second image, each second pixel-value gradient being a function of a pixel-value at the coordinate and pixel-values at adjacent pixel-value coordinates.

14. A motion detection system comprising circuitry that executes the method of claim 1.

15. The motion detection system of claim 14, the circuitry including one of an application-specific integrated circuit and a field-programmable gate array.

16. The motion detection system of claim 14, the circuitry comprising:

a processor; and a memory storing a first image and a second image of a scene and machine readable instructions, that when executed by the processor, control the processor to execute the method of claim 1.

17. The motion detection system of claim 14, further comprising an image sensor, communicatively coupled to the circuitry, that records the first image and the second image.

18. The motion detection system of claim 17, further comprising a camera that includes the image sensor, that captures the first image and the second image.

19. A non-transitory computer readable medium storing instructions, that when executed by a processor, cause the processor to execute the method of claim 1.

* * * * *